P. A. RASMUSSEN.
PERAMBULATING TRACTOR.
APPLICATION FILED NOV. 17, 1919.

1,382,854.

Patented June 28, 1921.
6 SHEETS—SHEET 1.

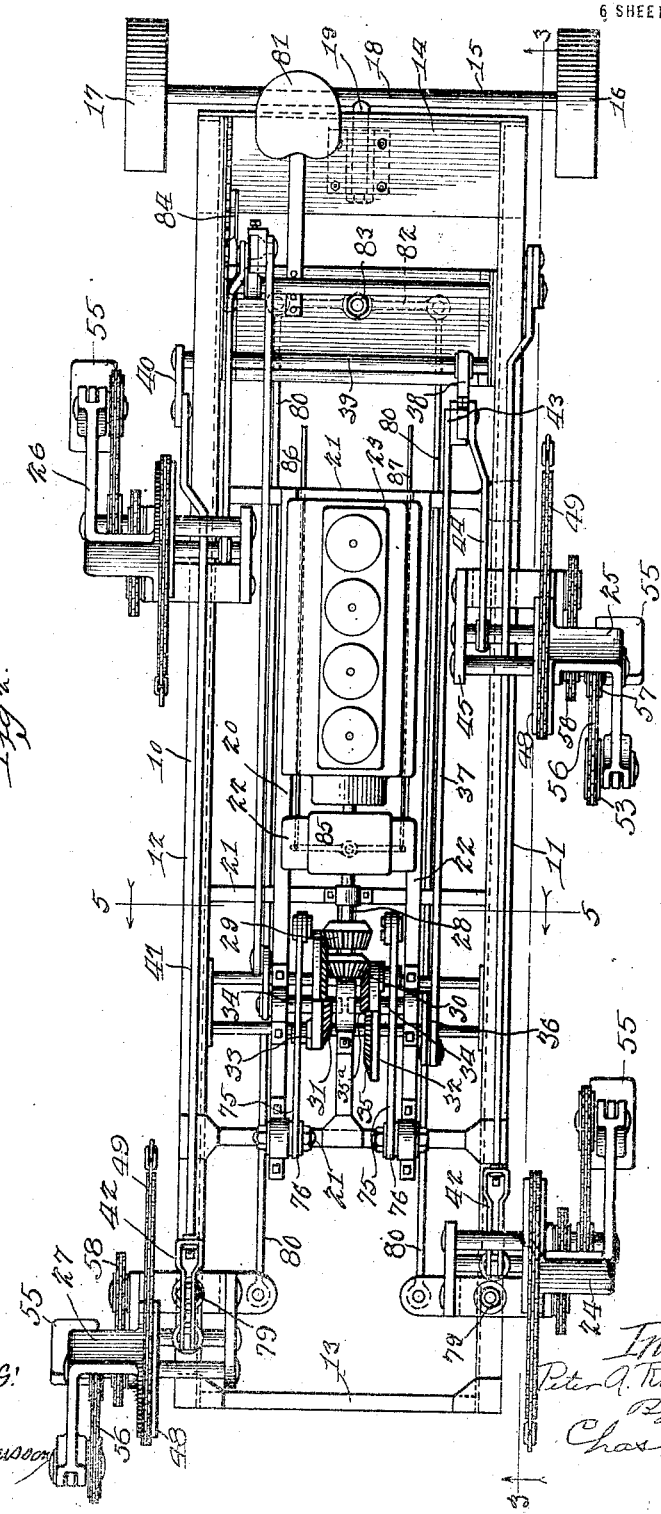

P. A. RASMUSSEN.
PERAMBULATING TRACTOR.
APPLICATION FILED NOV. 17, 1919.
1,382,854.
Patented June 28, 1921.
6 SHEETS—SHEET 3.
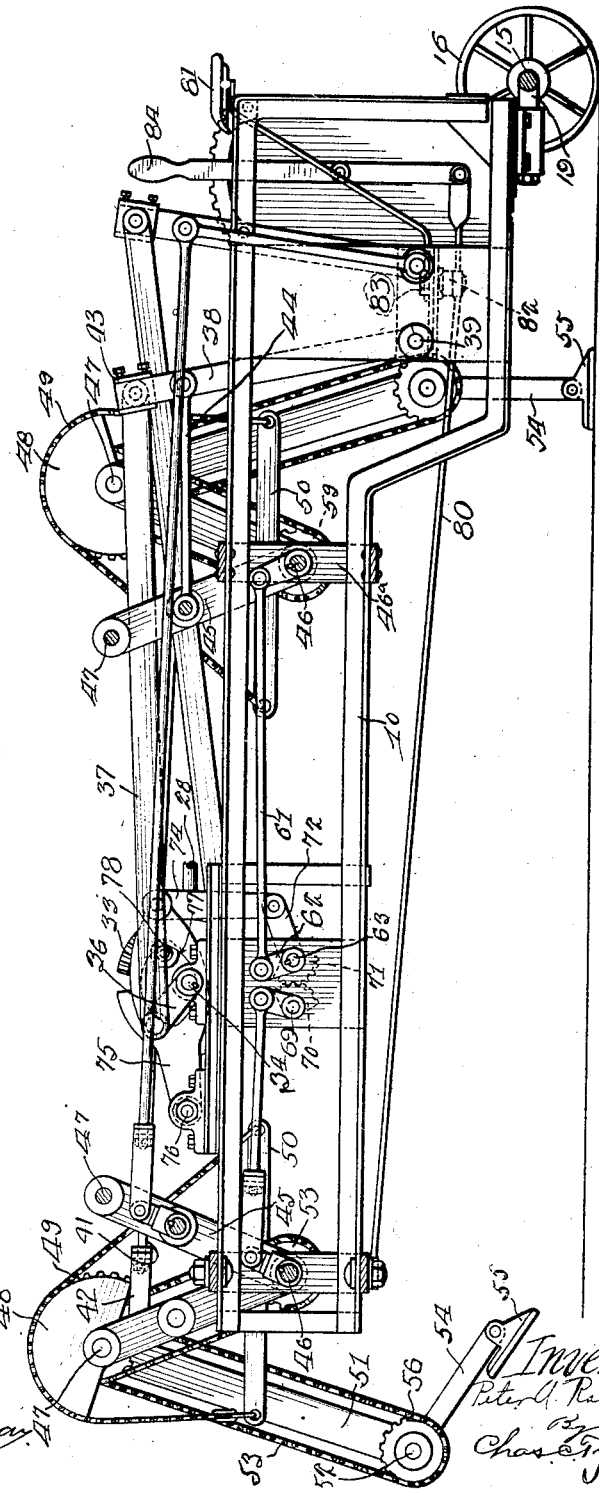

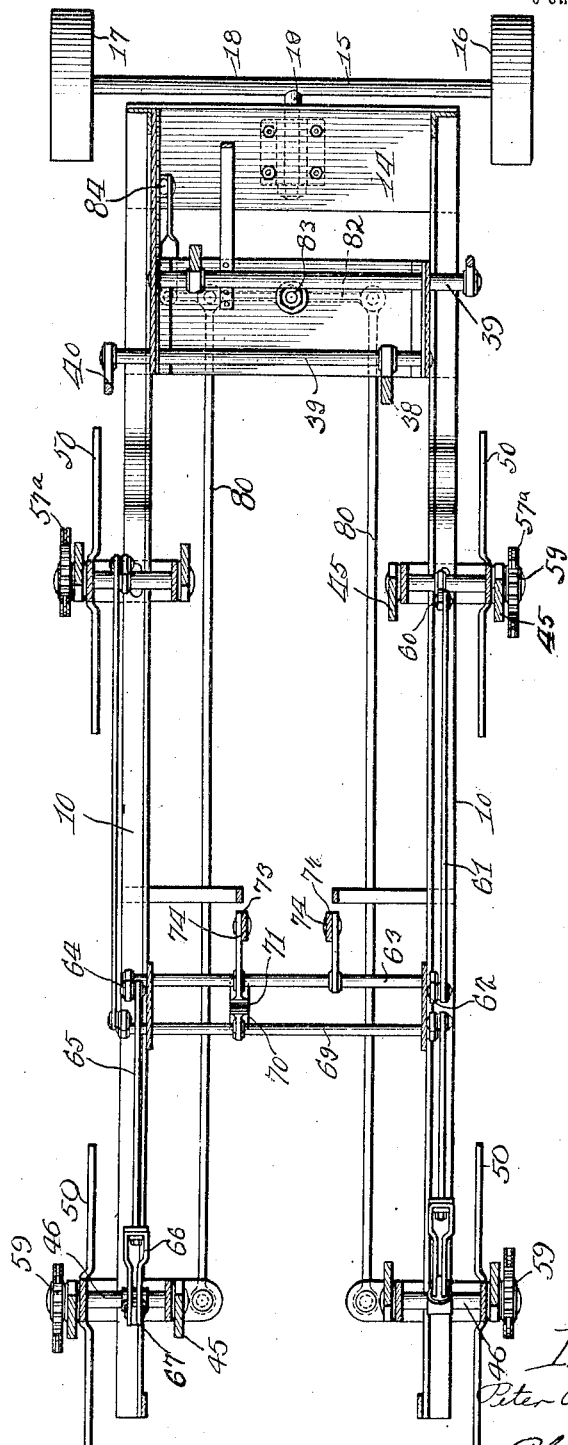

P. A. RASMUSSEN.
PERAMBULATING TRACTOR.
APPLICATION FILED NOV. 17, 1919.
1,382,854.
Patented June 28, 1921.
6 SHEETS—SHEET 5.
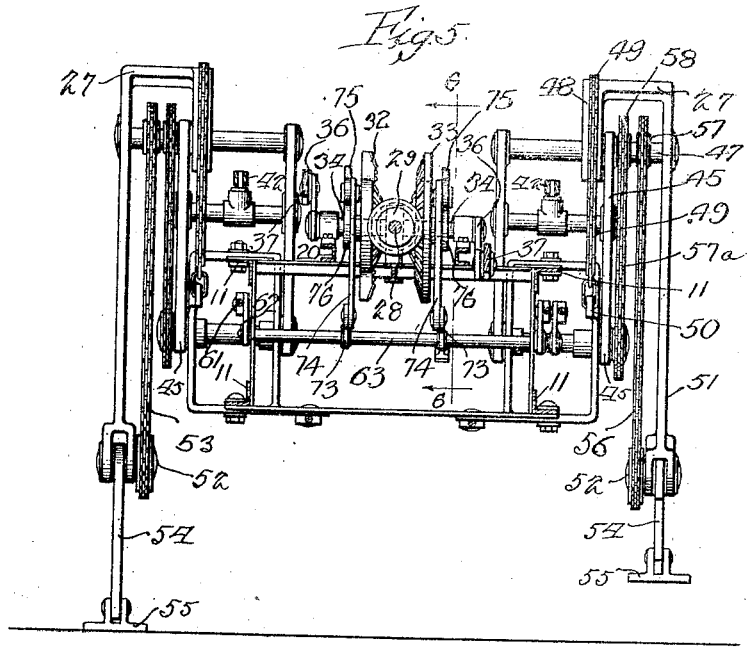
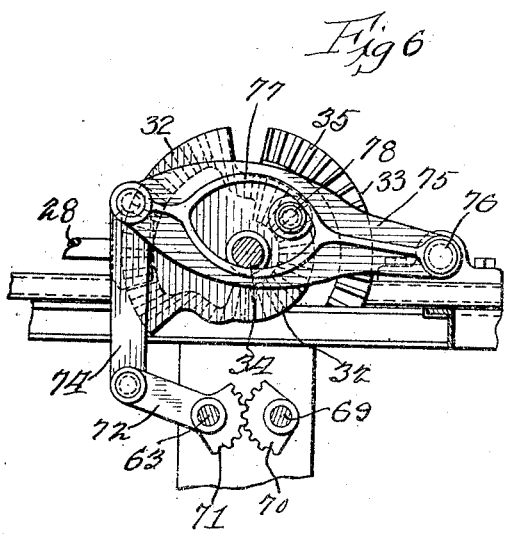

P. A. RASMUSSEN.
PERAMBULATING TRACTOR.
APPLICATION FILED NOV. 17, 1919.
1,382,854.
Patented June 28, 1921.
6 SHEETS—SHEET 6.
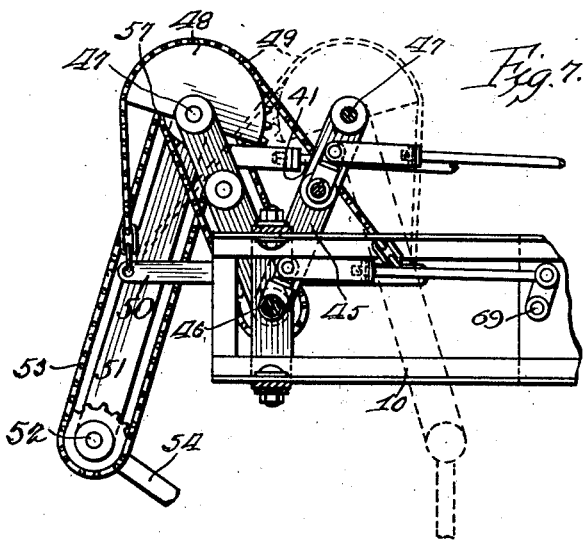
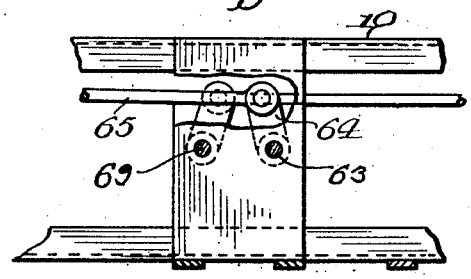
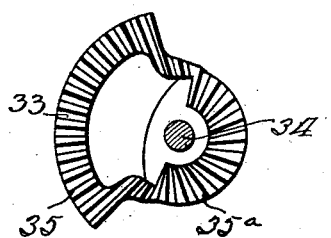

UNITED STATES PATENT OFFICE.

PETER A. RASMUSSEN, OF CHICAGO, ILLINOIS.

PERAMBULATING TRACTOR.

1,382,854.  Specification of Letters Patent.  Patented June 28, 1921.

Application filed November 17, 1919. Serial No. 338,451.

*To all whom it may concern:*

Be it known that I, PETER A. RASMUSSEN, a citizen of the United States, residing at Chicago, in the county of Cook and State of Illinois, have invented certain new and useful Improvements in Perambulating Tractors, of which the following is a specification.

This invention relates to improvements in a motor driven machine or tractor, of a type wherein the supporting and moving members therefor simulate the stepping action, in operation, of a draft animal, and which, by reason of its novel and peculiar construction, arrangement and operation of its parts can be effectually employed or operated on uneven surfaces or ground having stones or other projections thereon.

The principal object of the invention is to provide a machine of the above mentioned general character which can be used for various agricultural purposes, such as for drawing plows, harrows, mowing machines, wagons or trucks and the like, which can be suitably connected to its rear portion, or may be employed in excavating operations for forcing scoops or shovels, suitably mounted on or connected to its front part, into the material to be removed, and when the same are loaded to retract, and convey them to a desired point where they may be dumped of their loads.

The invention has as a further object the production of a machine of this character which may be steered in its course while in motion and be driven in either a forward or backward direction, depending upon necessity or the desires of the operator.

Other objects and advantages of the invention will be set forth in the following description and explanation.

In the accompanying drawings, which serve to illustrate an embodiment of the invention—

Fig. 2 is a top plan view of the structure shown in Fig. 1.

Fig. 3 is a section taken on line 3—3 of Fig. 2.

Fig. 4 is a section taken on line 4—4 of Fig. 1.

Fig. 5 is a section taken on line 5—5 of Fig. 2.

Fig. 6 is a detail sectional view of elements employed in the structure, taken on line 6—6 of Fig. 5.

Fig. 7 is a detail of a portion of the device showing the position of certain parts in dotted lines.

Fig. 8 is an elevation showing another detail of construction, and

Fig. 9 is a detail side elevation of one of the gears utilized in the structure.

Corresponding numerals of reference refer to like parts throughout the different views of the drawings.

Figure 1:
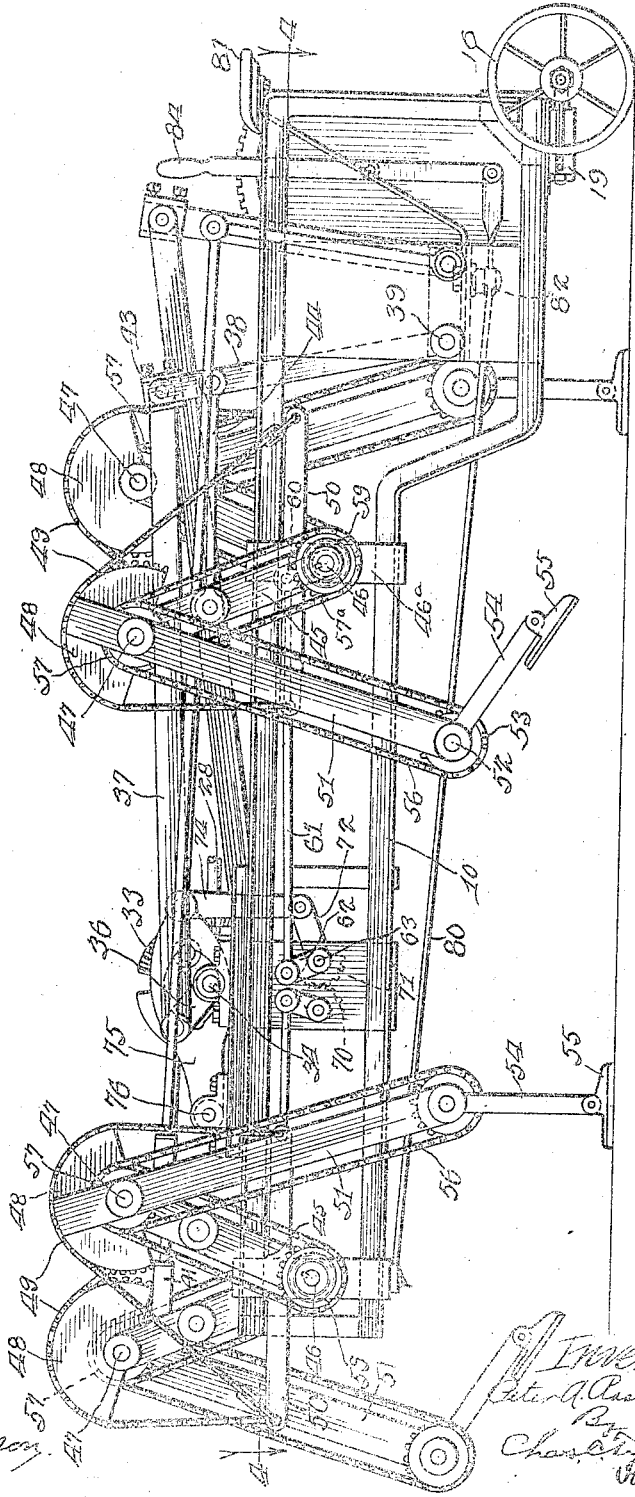
Figure 1 is a side elevation of a structure embodying one form of the invention.

The construction illustrated in the drawings employs a main frame generally designated 10 which includes the side sills 11 and 12, the end sills 13 and 14 which are all connected together to afford the rigid main frame 10. A truck including the wheels 16 and 17 and shaft 18 is pivotally connected to the end sill 14 by means of the horizontal pivot 19.

A supplemental frame 20 is provided which is composed of the cross beams 21—21 and the parallel supports 22—22. This supplemental frame supports the engine 23 and also various other elements which will be explained in detail in the following matter. To the main frame 10 is suitably connected a plurality of swinging tractor elements 24, 25, 26, and 27 which carry the ground engaging elements, these elements 24 to 27 being actuated by the engine 23 through intermediate mechanism all of which will be hereinafter more fully explained. During the operation of the device the diagonally opposite pairs of tractor elements 24 to 27 alternately engage and disengage the ground or surface over which the machine is being operated and this simulates the walking action of a horse or other draft animal.

The two forward elements 24 and 27 are constructed so that the same may be rotated to guide or steer the device during operation. Provision is also made whereby these elements may be actuated or steered from the seat of the operator.

To cause the operation of the machine the engine 23 is started. This causes the shaft 28 to revolve and the pinions 29 and 30 which are arranged one in front of the other upon the shaft to operate the gear mechanism generally designated 31. This gear mechanism 31 includes a pair of gears 32 and 33 each of which is rigidly fastened to its respective shaft 34—34 which is journaled in the parallel portions 22 of the supplemental frame.

The gears 32 and 33 each include the segmental toothed portions 35 and 35ª which are concentric to each other but are of relatively different diameters, so that during rotation one portion such as 35 will be engaged by the rearward pinion 29 and the other portion such as 35ª will be engaged by the forward pinion 30, which are arranged upon the shaft 28. This will impart a variable motion to the shafts carrying the gears 32 and 33 which will consequently vary the motion of parts connected with said shafts 34—34 and to said gears. It will also be noted that these gears 32 and 33 will be rotated in opposite directions with respect to each other, as the same are positioned upon opposite sides of the pinions 29 and 30.

Through the medium of these gears and portions connected thereto and operated thereby, the elements 24 to 27 have imparted thereto a motion similar to the leg motion of a horse while walking.

In view of the fact that the mechanism for operating the pairs of elements 25 and 24 and 26 and 27, correspond with each other, only one thereof will be explained in detail. This mechanism includes a crank arm 36 which is connected to one of the stub shafts 34. This crank arm has a pitman 37 connected thereto which extends backwardly to the crank arm 38, said arm being in turn rigidly connected to the shaft 39 which latter extends across to the opposite side of the machine where it has provided thereon another lever or crank arm 40. To the upper end of this lever 40 is connected a pitman 41 the opposite end of which terminates in a connection with a universal joint 42 which is in turn connected with a swinging portion of the element 27. An adjustable connection 43 is provided between the pitman 37 and the lever 38 so that movement of the parts may be varied.

Another pitman 44 is provided, which connects the lever 38 and a swinging portion as 45 of the element 25 together; thus the motion derived from the crank arms 36 will be transmitted to the levers 38 and 40, which will cause the diagonally opposite pair of elements 25, 27 to be moved together. This swinging portion 45 is loosely mounted upon the shaft 46 which is mounted in the support 46ª which is part of the frame 10. This arm extends upwardly and carries the shaft 47, this last mentioned shaft in turn carrying a sprocket 48 which is rigidly connected thereto. A sprocket chain 49 is passed over the sprocket 48 and has its opposite ends secured to the opposite ends of the rigid arm 50. An arm 51 extends downwardly from the shaft 47 and is connected thereto. Consequently as the arm 45 is rocked, the sprocket 48, shaft 47, and arm 51 will also have imparted thereto a swinging or rocking motion in a forward and backward direction.

The lower end of the arm 51 carries a shaft 52 to which is secured the sprocket 53 and the swinging element 54 carrying a loosely arranged ground engaging element 55. A sprocket chain 56 extends upwardly from the sprocket 53 and encircles the sprocket 57 which is loosely arranged upon the shaft 47. Another sprocket 58 is also loosely arranged upon this shaft, but is rigidly connected in any suitable manner with the sprocket 57. A sprocket chain 57ª extends from the last mentioned sprocket to the sprocket 59 which is keyed to the shaft 46. This shaft has a lever 60 fixedly secured thereto and has a pitman connection 61 extending from it to the lever 62 which is mounted upon the shaft 63. This shaft extends across the machine to the opposite side thereof, where it is provided with a lever or crank arm 64, (see Fig. 4). This crank arm has a pitman 65 extending therefrom and a universal connection 66 connecting said pitman with the crank lever 67 of the element 27. From this it can be seen that the diagonally opposite pairs of elements such as 24—26 and 25 and 27 will have a similar successive motion imparted to them, as each pair is actuated by mechanism similar to that just described.

Another shaft 69 is arranged in proximity to the shaft 63 and also has lever and pitman connections similar to those described in connection with the shaft 63, which coöperate to actuate similar portions of the elements 24 and 26.

Each of these shafts 63 and 69 has in addition a segmental gear 70 and 71 provided thereon which mesh with each other and transmit the motion of one shaft to the other. The shaft 63 has a pair of crank arms 72 and 73 securely fastened thereon, each of which has a link 74 which in turn is connected with its respective lever 75 of which there are two, one arranged upon each side of the gear mechanism 31 which includes the gears 32—33. These levers are pivoted at 76 and of a construction as shown in Fig. 6, they having the cam opening 77 so as to permit the shafts 34 to be passed through them and to accommodate the anti-friction rollers 78 provided upon each of the gears 32 and 33, which engage the inner periphery of the openings 77 of the levers and raise and lower the same and rock the shafts 63 and 69 to operate the shafts 63 and 69 and those parts which are coöperatively connected therewith.

As before stated, a means is provided whereby the device may be steered in its course. To accomplish this end the most forward elements 24 and 27 are pivotally connected to the frame 10, by means of the king bolts 79, and are provided with the connecting rods 80, which extend back into proximity to the seat 81, and are connected to the lever 82 which is pivoted at 83. This lever is connected to the hand lever 84.

The operation of this lever 84 will move the lever 82 and by virtue of the connecting rods 80 being connected therewith will cause these forward elements to turn to the right or left depending upon the direction in which the lever 84 is moved.

The device is further provided with a clutch and gear shifting mechanism which may be of the ordinary type now in use. These are confined in the casing 85 and controlled by the rods 86 and 87. These being of the usual construction, no detailed explanation of their construction or operation is deemed necessary.

From the foregoing explanation of the construction, it is evident that when the engine is started the gears generally designated by the numeral 31 will raise and lower the levers 75 which due to their connections rock the shafts 63 and 69. This movement is imparted to the levers 60 and 64 which rock the shaft 46 of the elements 25 and 27 and by virtue of the sprocket and sprocket chain connections leading therefrom to the sprocket 53 will swing the portion 54 causing the element 55 to engage the ground surface and propel the machine along.

By virtue of the link connection 44 between the crank arms 38 and 45 the motion of the crank arm 38 will be transmitted to the arm 45, and by virtue of the sprocket 48 and chain 49 the shaft 47 and arm 51 will also be rocked backwardly and forwardly.

By referring to Fig. 1, and particularly to the rearmost element 25 it can be seen that said arm 51 will be moved rearwardly, the portions 54 and 55 will move therewith but will also swing forwardly and engage the ground. The arm 51 will continue to swing rearwardly until it assumes a position in which the element 55 and shafts 52, 47 and 46 are in vertical alinement with each other, and by virtue of the fact that the elements 25 and 27 operate together, this will support the whole frame work each time either of said pairs of elements assume this position.

After the parts assume this vertical relation the movement continues until the parts assume the position of the elements 24 and 26 as shown in Fig. 1, which causes the machine to be advanced, it being understood that during this time the remaining similar elements are moving to repeat the action just described.

From the foregoing it is evident that a simple and efficient arrangement has been produced for accomplishing the end sought, and as I have illustrated one embodiment of the invention, it is obvious that changes and modifications may be resorted to without departing from the spirit of the appended claims.

Having thus fully described my invention, what I claim as new and desire to secure by Letters Patent is—

1. In a device of the character described, the combination of a motor, tractor elements having a stepping action driven by said motor, a driven shaft operable by said motor, a differential gear mechanism driven by said shaft, an oscillatory shaft operably connected with the gear mechanism, said last named shaft forming a means for actuating said tractor elements.

2. In a device of the character described, the combination of a motor and a plurality of parallel pairs of tractor elements carrying said motor, said tractor elements having a stepping action and being driven by said motor and means including a differential gear mechanism whereby the diagonally disposed pairs of tractor elements are caused to alternately engage and be raised from the surface upon which the same are operated.

3. In a device of the class described, the combination of a motor and a plurality of pairs of tractor elements, one of said pairs being arranged in rear of the other, said elements having a stepping movement and the diagonally opposed pairs being arranged to alternately engage the surface upon which the device is operated and means coöperatively connected with the motor for actuating the tractors, said means including a differential gear mechanism and an oscillatory shaft for driving the diagonally disposed pairs of tractor elements.

4. In a device of the class described, the combination of a plurality of pairs of tractor elements, said elements being composed of a plurality of members hingedly connected together, one of said members having means connected thereto for actuating the same and having another member connected thereto, said last mentioned member also having a member connected to it, means connected to the second mentioned member for moving the same upon the actuation of the first mentioned member and means extending from the second mentioned member for actuating the last mentioned member and means for actuating the diagonally disposed pair of tractor elements together.

5. In a machine of the class described, the combination of a plurality of pairs of tractor elements, means for actuating the diagonally disposed pair together, means for actuating one of said pairs to steer the device, a frame to which said tractor elements are connected, said elements including a pivoted member secured to the frame, means for actuating said member and means connecting one of said pivoted elements with the other for actuating the same upon the movement of the element secured to the frame.

6. In a device of the character described, the combination of a frame, a plurality of tractor elements having a stepping action secured to the frame, said elements including a plurality of members pivotally connected with each other one of which is connected to the frame, means for actuating said last mentioned member, means for moving the member connected to said last mentioned member upon the movement of said member which is secured to the frame, another pivoted member secured to the member which is actuated upon the movement of the member secured to the frame, an oscillatory shaft and means connected with said shaft for actuating said last mentioned member.

7. In a machine of the class described, the combination of a plurality of pairs of tractor elements composed of connected members and having a stepping action, a differential gear mechanism for actuating the diagonally disposed pairs of tractor elements together, a shaft, means actuated by said gear mechanism for oscillating said shaft and means connected with said shaft for actuating one of the members of the tractor elements.

8. In a device of the class described, the combination of a motor and a plurality of pairs of tractor elements carrying said motor, said elements being arranged to alternately engage and be lifted away from the surface upon which the device is being operated, a pair of said tractor elements being constructed to rotate upon independent parallel axes to permit the device to be steered.

9. In a device of the character described, the combination of a motor and a plurality of pairs of tractor elements carrying said motor, said elements being arranged to alternately engage and be lifted away from the surface upon which the device is being operated and means whereby one of said pairs may be moved to steer the device in its path, said last mentioned pairs being mounted upon vertical shafts which are substantially parallel to each other.

10. In a device of the character described, the combination of a motor and a plurality of pairs of tractor elements, carrying said motor, said elements consisting of jointed members, said pairs being arranged to alternately engage and be lifted away from the surface upon which the device is being operated, means for moving said tractor elements, said means including a stationary chain and a sprocket coöperating with the chain.

11. In a device of the character described, the combination of a motor and a plurality of pairs of tractor elements carrying said motor, said elements consisting of jointed members, said pairs being arranged to alternately engage and be lifted away from the surface upon which the device is being operated, one pair of said elements being operable to steer the device in its course, means for operating said tractor elements, said means including a stationary chain and a sprocket, said sprocket being movable with the tractor elements.

12. In a device of the character described, the combination of a motor and a plurality of tractor elements consisting of jointed elements arranged to alternately engage and be lifted away from the surface on which the device is being operated, said elements being arranged in pairs one pair in front of another, the forward pair being pivoted to permit the same to be turned to steer the device in its course, said tractor elements being composed of jointed members having means coöperatively connecting one member with the other for transmitting the movement of one member to the other.

13. In a device of the class described, the combination of a motor and a plurality of pairs of swinging tractor elements arranged to alternately engage and be lifted away from the surface upon which the device is operated and means for actuating said tractor elements, said means including a swinging element having secured thereto a second pivoted member, a sprocket connected to said pivoted member, and a sprocket chain coöperating with said gear.

14. In a machine of the class described, the combination of pivoted tractor elements, composed of members which are pivotally connected together, means connected to one of said elements for actuating said last mentioned member and means arranged adjacent an end of said member for actuating the member connected to it.

15. In a machine of the class described, the combination of pivoted tractor elements, composed of members which are pivotally connected together, a frame, one of said elements being connected to the frame, means for actuating said element, a pair of elements, pivotally connected to the first mentioned element and means extending from one element to the other for actuating the same upon the movement of the element connected to the frame.

16. In a device of the class described, the combination of a plurality of pairs of tractor elements, said tractor elements being composed of a plurality of members hingedly connected together, one of said members having means connected thereto for actuating the same, said member having another member connected thereto and said last mentioned member having another member secured to it, means connected to the second mentioned member for moving the same upon the movement of the first mentioned member, and means extending from the second mentioned member for actuating the last mentioned member.

PETER A. RASMUSSEN.